United States Patent Office 2,708,360
Patented May 17, 1955

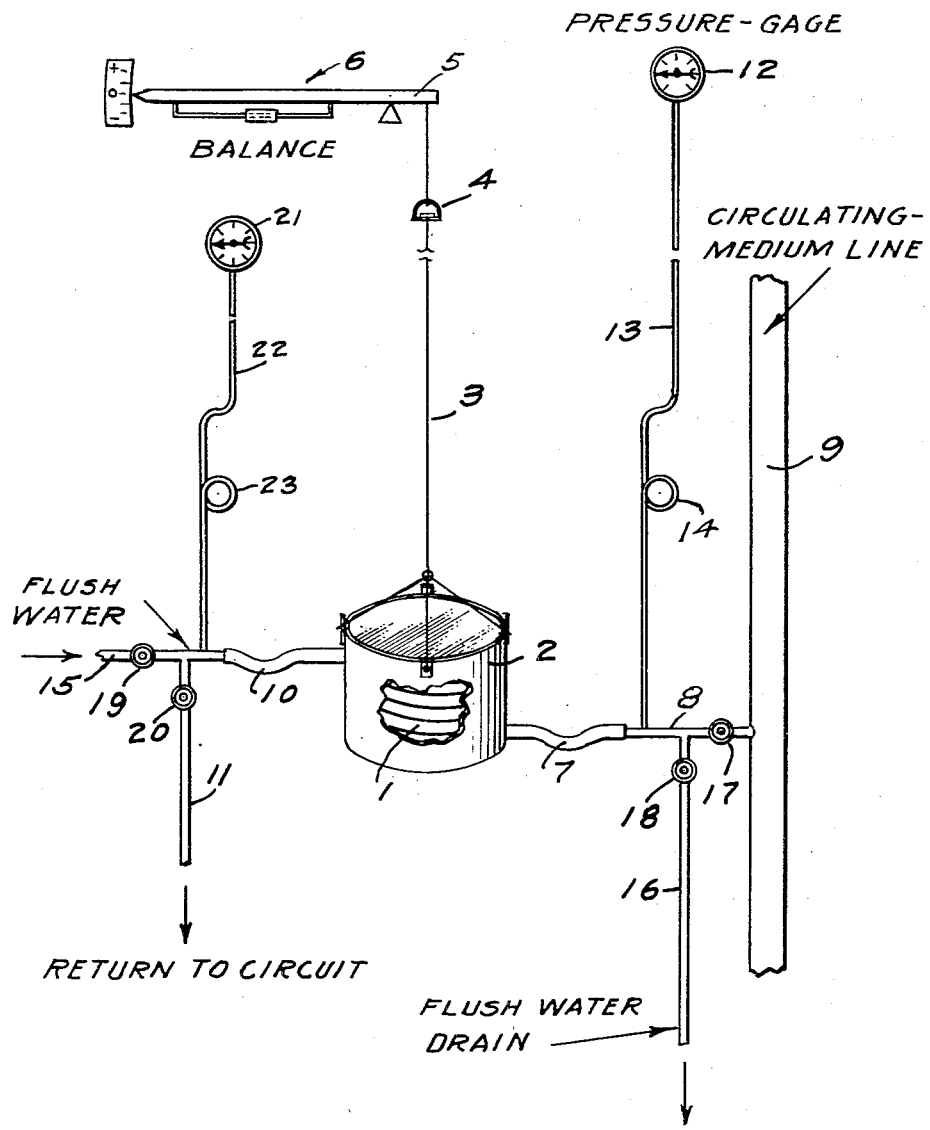

2,708,360

DEVICE FOR CONTINUOUSLY MEASURING DENSITY OF UNSTABLE SUSPENSIONS

Max R. Geer, Seattle, Wash., and Mark J. Klein, Las Vegas, Nev., assignors, by mesne assignments, to the United States of America as represented by the Solicitor of the Department of the Interior Application December 15, 1952, Serial No. 326,175

2 Claims. (Cl. 73—32)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to an apparatus for continuously measuring the density of liquids and, more particularly, to an improvement in such apparatus whereby the density of unstable suspensions may be continuously and accurately measured.

In the heavy-medium process now widely used for concentrating coal and minerals, the separation effected between constituents takes place in a suspension of finely divided solids in water. The specific gravity of the suspension is intermediate between that of the two constituents to be separated, so that one will float, while the other sinks. Control of the specific gravity of the suspension or medium is thus an essential feature of the process; such control necessarily requires measurement of specific gravity. In most heavy-medium plants the density of the suspension is measured by periodically weighing a known volume. This manual operation is time-consuming, cumbersome, and likely to be inaccurate unless performed painstakingly by a competent operator.

Automatic means heretofore employed for continuously indicating liquid density have not been suitable for use with unstable suspensions because of the difficulty in keeping the medium solids in suspension, and because of the difficulty in cleaning these devices from tramp material or settled suspension solids. Other devices are intricate and delicate, requiring frequent maintenance to preserve reliability.

An object of this invention is to provide a device for continuously and accurately indicating the density of unstable suspensions.

Another object of this invention is to provide a simple, reliable, and highly accurate device for continuously indicating the density of unstable suspensions.

Another object is to provide a device of the type described that is substantially free from maintenance and which may be readily flushed and cleaned between periods of operation.

These and other objects and advantages of the invention will become apparent from the ensuing description and from the drawing, in which:

The sole figure is a diagrammatic illustration of the device of this invention positioned in a by-pass line in a circulating system.

The manner of using this invention, in general, comprises continuously passing unstable suspension upwardly through a coil of flexible tubing, continuously weighing the coil of tubing and its contents, and maintaining such a pressure drop through the tubing that the velocity and turbulence produced prevents the suspended solids from settling out of the suspending medium.

The apparatus of this invention comprises a balance, a coil of flexible tubing having one end elevated above the other end, means for suspending the coil of tubing from an arm of the balance, inlet means for passing a liquid or suspension into the lower end of the coil, outlet means for withdrawing the liquid or suspension from the elevated end of the coil, and means for flushing the coil.

Referring now to the drawing, for a more detailed description of the densimeter, as the device may be termed, and of the method of operation, a length of flexible tubing 1 is shown coiled in a container 2 in generally upward spirals, and is suspended by means of line 3 and swivel 4 from arm 5 of a balance generally indicated as 6.

The tubing 1 should be as flexible as possible for purposes of facilitating cleaning and for other reasons hereinafter described, and accordingly is preferably made of flexible material rather than of metal. Rubber or plastic materials are suitable. These materials also have the advantages of being light in weight, relatively cheap, easily installed, and resistant to corrosion and scouring as compared to more rigid metallic tubing. A forty-foot coil of ordinary ¾-inch garden hose has been found suitable for this purpose.

The coil of flexible tubing is connected at its lower end by means of a short flexible coupling 7 to by-pass line 8 in the main line 9 of the plant system. Similarly, the upper end of the flexible tubing 1 is connected by flexible coupling 10 to by-pass return line 11. Alternatively for some operations the couplings 7 and 10 may connect the coil 1 into a section of the main line.

A gage 12, or other suitable means of measuring pressure, is connected to line 8 through line 13 and pigtail or trap 14. Ordinarily line 11 discharges at atmospheric pressure, and gage 12 thus indicates the pressure drop through the hose. If installed so line 11 discharges at a pressure higher than atmospheric, a second gage 21 is connected to line 11 through line 22 and pigtail or trap 23; the difference in the pressures indicated by gages 12 and 21 is then the pressure drop through the hose.

A flush water inlet 15 is provided for introducing flush water at the upper end of the coil 1, and an outlet 16 is provided at the lower end for discharging flush water to a drain (not shown). Valves 17, 18, 19, and 20 are provided to enable the operation to be shut-down and the system to be flushed.

In operation, medium from the plant circuit enters the coil of hose 1 through flexible tubing 7, and is returned to the circuit through similar connection 10. The densimeter is installed in such manner or at such location as to ensure a pressure differential between line 8 and discharge 11 of at least 5 p. s. i. To this end, an ideal location from which to draw medium is a point in a vertical pipe at which the static head is 10 to 15 feet.

Since the hose 1 contains a constant volume of medium, any change in density results in a corresponding change in weight. Thus, if a tare weight on the balance is shifted to bring the indicating arm to zero on the scale when the circulating medium is at the desired density, any subsequent change in density displaces the arm from the zero position.

In operation of most heavy-medium plants, the desired specific gravity remains fixed or is changed only a few hundredths at the most. Should a change in the density of the medium become necessary, the tare on the balance can be set to bring the indicating arm to zero as soon as the circulating medium is at the correct density. Density changes are then indicated just as before.

The use of a flexible hose of suitable length and diameter as a constant-volume vessel and installation so as to maintain a critical minimum pressure drop to prevent sedimentation are unique features of this densimeter. There is sufficient velocity and turbulence in the hose to prevent the unstable suspension from settling out, and yet this turbulence does not alter the volume of medium being weighed. With true liquids an open-top vessel can be used to provide constant volume. The top of the vessel serves as an overflow weir; if a relatively small, quiescent flow of the liquid over the weir is maintained, such a vessel provides a constant volume. However, if used with an unstable suspension, the quiescent condition in this type of vessel permits some of the solids to settle. Thus, either the volume of the vessel is reduced by a cake of solids on the bottom, or at least the suspension in the vessel is more dense than that either entering or leaving. If a turbulent flow is employed in this type of vessel to prevent the solids from thickening, the overflow level is variable and hence the volume is not constant.

The invention may be used advantageously for control of magnetite suspensions of the type commonly used in heavy-medium plants treating coal. However, with no alteration in the device, and with only a minor change in the method of installation, it should be equally applicable to the suspensions of ferrosilicon used in concentrating ores. In fact, while it is particularly advantageous for use with any unstable suspension, it could be used for measuring the density of any liquid.

For use with magnetite medium, in which a specific gravity within the range of 1.30 to 1.77 is generally employed depending on the separation required, the densimeter must be installed so that a pressure drop of not less than 5 p. s. i. takes place in the hose. The velocity produced by a smaller pressure drop is not sufficient to prevent magnetite from settling out. For use with ferrosilicon medium, which is less stable, the pressure drop would have to be higher to prevent sedimentation. Fluctuations of inlet pressure of the magnitude likely to occur have only minor influence on the densimeter so long as the minimum pressure drop is maintained.

As shown in the drawing, the densimeter is provided with a flush-water line for cleaning out the hose when the plant is shut down. If the hose were not flushed, solids would settle in the coils and change the volume of medium being weighed. The flow of flush water should be downward, whereas the flow of medium is made upward through the coils to avoid entrapment of air. Since the hose is flexible it may be readily freed of any sedimentation or encrustations by simply flexing it while it is being flushed.

Hundreds of check determinations have been made between the specific gravity indicated by the densimeter and that found by weighing a calibrated flask medium. The average deviation has been .001, and the maximum difference ever observed was .004. In fact, a series of careful check weighings of flasks of the same medium often show a variation that substantially exceeds the deviation of densimeter readings from flask weights.

It will be appreciated from a reading of the foregoing specification that the invention herein described is susceptible of various changes and modifications without departing from the spirit and scope thereof.

What is claimed is:

1. Apparatus for continuously measuring the density of unstable suspensions comprising a balance, a length of flexible tubing coiled in generally upward spirals, means for holding said flexible tubing in said coiled relation, means for suspending the coil of flexible tubing from an arm of said balance, inlet means for passing said suspension into the lower end of said coil, outlet means for withdrawing said suspension from the upper end of said coil, and means for measuring the pressure drop through said coil.

2. Apparatus for continuously measuring the density of unstable suspensions comprising a balance, a container suspended from an arm of said balance, a coil of plastic tubing approximately forty feet in length and approximately three-fourths of an inch in diameter carried by said container and held thereby in generally upward spirals, said tubing having a lower end extending from the lower portion of said container and an upper end extending from an upper portion of said container, inlet means coupled to the lower end of said tubing for passing a fluid into said coil, outlet means coupled to the upper end of said tubing for withdrawing said fluid, and means for measuring the pressure drop through said coil.

References Cited in the file of this patent
UNITED STATES PATENTS

| | | |
|---|---|---|
| 1,511,549 | Wells | Oct. 14, 1924 |
| 1,511,604 | Ganucheau | Oct. 14, 1924 |
| 1,918,270 | Kegl et al. | July 18, 1933 |